UNITED STATES PATENT OFFICE.

RALPH S. WITTENBERG, OF THE DALLES, OREGON, ASSIGNOR TO PACIFIC EVAPORATOR COMPANY, OF PORTLAND, OREGON, A CORPORATION OF OREGON.

METHOD OF PREPARING EVAPORATED VEGETABLES.

1,372,112.  Specification of Letters Patent.  Patented Mar. 22, 1921.

No Drawing.   Application filed April 17, 1919.   Serial No. 290,762.

*To all whom it may concern:*

Be it known that I, RALPH S. WITTENBERG, a citizen of the United States, residing at The Dalles, in the county of Wasco and State of Oregon, have invented new and useful Improvements in Methods of Preparing Evaporated Vegetables, of which the following is a specification.

This invention relates to the method of preparing evaporated vegetables and consists in certain improvements therein as will be hereinafter fully described and pointed out in the claims.

In preparing certain vegetables for evaporation, as for example potatoes, it is usual to slice the potatoes preparatory to drying. The exposed surfaces are subject to discoloration involving chemical changes and this detracts from the attractiveness and quality of the finished product. Further where drying is carried out as it usually is by placing the sliced material on trays and drying it in this position the surfaces are more or less in contact and tend to mat, or unite and this detracts from the attractiveness and quality of the finished product. The object of the present invention is to provide a method whereby vegetables may be prepared without such deterioration of the exposed surfaces of the sliced material and without the matting while drying.

In describing the method I will confine it to potatoes and in the more limited sense the invention is directed to potatoes because it is believed that it is of peculiar advantage with relation to this product.

In carrying out the process the potatoes are pared by any of the well known, or, usual methods and sliced. This slicing may be carried to the extent of giving to the finished product the form of cubes or dice. The sliced material is then subjected to the abrasive action of a jet of water which is directed against the cut surface with sufficient force to remove the free substances exposed by the slicing of the potatoes. It will be understood that as the potato is sliced certain cells are severed and the substance thus exposed is particularly susceptible to chemical change and discoloration. The abrasive effect of the jet of water removes from the surface this material and thus prevents this chemical change at the surface and this discoloration of the surface. It will be understood that the jet with its abrasive action not only removes the free substances and partly oxidized material but also coats momentarily the material so as to prevent subsequent oxidation before the usual processing or evaporating can take place.

With some materials and with some potatoes it is desirable to first remove the free material through the action of jets, then to subject the material to steam jets which seem to loosen or bring to the surface some added starchy material and then apply water jets so as to remove this added free material. After all these treatments the potatoes may be processed in any of the ordinary methods desired as a preliminary as by further steaming, or if steam is not used in the preliminary preparation by steaming and the material is then carried through the evaporator and dehydrated. Preferably the evaporator is one affecting the dehydrating by subjecting the potatoes to a rapid current of air at atmospheric humidity and at a temperature not less than 125° F. nor more than 156° F.

In subjecting the sliced material to the abrading jet it is common in commercial practice to provide a battery of jets and it has been found that jets impelled with water pressures of ten to twenty pounds at the nozzle will give good results and that a three quarter inch supply line carried at eighty pounds will supply from ten to fifteen nozzles of the proper size to effect the purpose. The pressure can be varied to suit different materials. For convenience the sliced material is placed on the same trays in which it is subsequently processed and dried and is subjected *en masse* to the action of the jets. If desired a battery of jets may be arranged to act on the material from below but in ordinary practice jets with sufficient pressure delivered from above will lift the material from the tray and operate to some extent even on the bottoms of the material resting on the trays. It will be understood that a stream of water played on potatoes, or vegetables or that immersing the potatoes in water will, to a certain extent, prevent discoloration by preventing somewhat the oxidizing of the surface but the advantageous effect of the method here described cannot be accomplished without the abrading action which removes the free substances exposed by the slicing of the material. The stream of liquid, however, which is applied to the sliced material immediately the free substances are removed tends to arrest oxidation and to prevent it in the short interval of time required to transfer the material to the processing apparatus or to the evaporator.

The invention broadly relates to all vegetables including what are commonly termed fruits but is of special advantage with relation to starchy substances, such as potatoes.

What I claim as new is:—

1. The method of preparing vegetables which consists in slicing the vegetables and subjecting the cut surfaces thereof to the abrasive action of a jet of fluid so directed and of such force as to remove the free substances exposed by the slicing.

2. The method of preparing vegetables which consists in slicing the vegetables and subjecting the cut surfaces thereof to the abrasive action of a jet of liquid to remove the free substances exposed by the slicing.

3. The method of preparing vegetables which consists in slicing the vegetables and removing the free pulpy substances exposed by the slicing and which are subject to rapid chemical change and deterioration and dehydrating the sliced material so treated.

4. The method of preparing vegetables which consists in slicing the vegetables, subjecting the cut surfaces thereof to the abrasive action of a jet of fluid so directed and of such force as to remove the free substances exposed by the slicing, and dehydrating the product so prepared.

5. The method of preparing evaporated vegetables which consists in slicing the vegetables, subjecting the cut surfaces to the abrasive action of a fluid jet so directed and of such force as to remove the free substances exposed by the slicing, and dehydrating the sliced vegetables with some of the cut surfaces in contact.

6. The method of preparing evaporated potatoes which consists in slicing the potatoes, subjecting the cut surfaces to the abrasive action of a fluid jet so directed and of such force as to remove the free substances exposed by the slicing, and dehydrating the sliced potatoes with some of the cut surfaces in contact.

7. The method of preparing evaporated vegetables which consists in slicing the vegetables; subjecting the cut surfaces to the abrasive action of a fluid jet so directed and of such force as to remove the free substances exposed by slicing; subjecting the vegetables to a steaming action; and dehydrating the sliced vegetables.

8. The method of preparing evaporated vegetables which consists in slicing the vegetables; subjecting the cut surfaces to the abrasive action of a fluid jet so directed and of such force as to remove the free substances exposed by slicing; then subjecting the vegetables to a steaming action; then subjecting the same a second time to the abrasive action of the fluid jet; and then dehydrating the sliced vegetables.

9. The method of preparing evaporated vegetables which consists in subjecting the sliced vegetables to a steaming action; then to the abrasive action of a fluid jet so directed and of such force as to remove the free substances exposed by slicing; and then dehydrating said vegetables.

In testimony whereof I have hereunto set my hand.

RALPH S. WITTENBERG